United States Patent
Xue

(10) Patent No.: US 9,256,352 B2
(45) Date of Patent: *Feb. 9, 2016

(54) TOUCH SCREEN TERMINAL AND METHOD FOR LOCATING ELECTRONIC DOCUMENT THEREOF

(75) Inventor: Tao Xue, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 14/234,624

(22) PCT Filed: Oct. 27, 2011

(86) PCT No.: PCT/CN2011/081372

§ 371 (c)(1),
(2), (4) Date: Feb. 24, 2014

(87) PCT Pub. No.: WO2012/151871

PCT Pub. Date: Nov. 15, 2012

(65) Prior Publication Data

US 2014/0229838 A1 Aug. 14, 2014

(30) Foreign Application Priority Data

Jul. 26, 2011 (CN) .......................... 2011 1 0210871

(51) Int. Cl.
G06F 3/0488 (2013.01)
G06F 3/0483 (2013.01)
(Continued)

(52) U.S. Cl.
CPC .......... *G06F 3/0483* (2013.01); *G06F 3/04842* (2013.01); *G06F 3/04886* (2013.01);
(Continued)

(58) Field of Classification Search
CPC . G06F 3/04842; G06F 3/0483; G06F 3/0488; G06F 6/04886; G06F 17/167; G06F 17/30873; G06F 17/30126; G09G 2380/14
USPC ........................... 715/728, 773, 780; 345/901
See application file for complete search history.

(56) References Cited

U.S. PATENT DOCUMENTS 6,331,867 B1 * 12/2001 Eberhard et al. ............... 715/864
6,411,973 B1 * 6/2002 Yianilos ........................ 715/246
(Continued)

FOREIGN PATENT DOCUMENTS

CN 101325764 A 12/2008
CN 101354727 A 1/2009
(Continued)

OTHER PUBLICATIONS

International Search Report in international application No. PCT/CN2011/081372, mailed on Apr. 19, 2012. (3 pages—see entire document).

(Continued)

*Primary Examiner* — Jennifer To
*Assistant Examiner* — John Repsher, III
(74) *Attorney, Agent, or Firm* — Oppedahl Patent Law Firm

(57) ABSTRACT

The disclosure relates to a touch screen terminal and a method for locating an electronic document thereof. The touch screen terminal comprises a setting module, a directory listing module, a detection module, a mode switching module, a real-time directory module, a preview module and a chapter/section switching module. The method comprises: generating a directory listing for an electronic document and storing it; detecting a screen aaaaaaaaaaaaaaa in a reading mode of current chapter/section of the electronic document; when it is detected that a user enables a chapter/section switching function, enabling a chapter/section switching mode to wait for the user to input a number of the chapter/section to switch to; when it is detected that the user inputs the number of the chapter/section to switch to, matching a directory entry in real time from the stored directory listing and displaying it; generating a preview for a corresponding chapter/section according to the number of the chapter/section to switch to input by the user and displaying it to the user; and when a confirmation of the switching operation is detected, switching to the previewed chapter/section. The disclosure is simple to operate and easy to implement, and improves the reading experience.

18 Claims, 3 Drawing Sheets

(51) Int. Cl.
  *G06F 3/0484* (2013.01)
  *G06F 3/16* (2006.01)
  *G06F 17/30* (2006.01)

(52) U.S. Cl.
  CPC .......... *G06F3/167* (2013.01); *G06F 17/30126* (2013.01); *G06F 17/30873* (2013.01); *G06F 3/0488* (2013.01)

(56) References Cited

U.S. PATENT DOCUMENTS

| | | | |
|---|---|---|---|
| 8,621,390 B1* | 12/2013 | Findley et al. | 715/818 |
| 2003/0020761 A1* | 1/2003 | Yanatsubo | 345/833 |
| 2005/0091612 A1* | 4/2005 | Stabb et al. | 715/816 |
| 2005/0243658 A1 | 11/2005 | Mack | |
| 2007/0300176 A1* | 12/2007 | Fischer et al. | 715/780 |
| 2008/0222552 A1* | 9/2008 | Batarseh et al. | 715/776 |
| 2008/0288894 A1* | 11/2008 | Han et al. | 715/855 |
| 2010/0083162 A1* | 4/2010 | Hernandez | 715/776 |
| 2010/0293498 A1* | 11/2010 | Maxfield | 715/776 |
| 2011/0055691 A1* | 3/2011 | Carlen et al. | 715/273 |
| 2011/0074699 A1 | 3/2011 | Marr et al. | |
| 2011/0154260 A1 | 6/2011 | Wang | |
| 2011/0289457 A1 | 11/2011 | Li et al. | |
| 2012/0102425 A1 | 4/2012 | Song | |
| 2012/0240074 A1* | 9/2012 | Migos et al. | 715/776 |
| 2013/0007653 A1* | 1/2013 | Stolyarov et al. | 715/784 |
| 2014/0250394 A1 | 9/2014 | Han et al. | |

FOREIGN PATENT DOCUMENTS

| | | |
|---|---|---|
| CN | 101853127 A | 10/2010 |
| CN | 101888425 A | 11/2010 |
| CN | 102012905 A | 4/2011 |
| CN | 102033698 A | 4/2011 |
| JP | 2006215819 A | 8/2006 |
| JP | 2006350649 A | 12/2006 |
| JP | 2008117310 A | 5/2008 |
| JP | 2009521754 A | 6/2009 |
| JP | 2013503386 A | 1/2013 |
| TW | 573260 B | 1/2004 |
| WO | WO 9312490 A1 * | 6/1993 |
| WO | 0141018 A2 | 6/2001 |
| WO | 2011025642 A1 | 3/2011 |
| WO | 2011075316 A1 | 6/2011 |

OTHER PUBLICATIONS

English Translation of the Written Opinion of the International Search Authority in international application No. PCT/CN2011/081372, mailed on Apr. 19, 2012. (8 pages—see entire document).
Supplementary European Search Report in European application No. 11865030.8, mailed on Mar. 30, 2015.
Google Japan Blog, mailed on Nov. 10, 2010.
International Search Report in international application No. PCT/CN2011/082035, mailed on May 3, 2012.
English Translation of the Written Opinion of the International Search Authority in international application No. PCT/CN2011/082035, mailed on May 3, 2012.
Supplementary European Search Report in European application number: 11865164.5, mailed on Nov. 12, 2015.

* cited by examiner

Fig. 2

Chapter one the definition of aesthetics

The aesthetics is *************************, so the aesthetics can be seen everywhere.

************************** a

Chapter one the definition of aesthetics

**************************

The generating of the aesthetics has a long history, *************************, the rich culture deposits are possessed.

************************** b

Chapter one the definition of aesthetics

**************************

The aesthetics cannot fully defined, ……, so it is necessary to treat differently.

c

TOUCH SCREEN TERMINAL AND METHOD FOR LOCATING ELECTRONIC DOCUMENT THEREOF

TECHNICAL FIELD

The disclosure relates to the field of communications, in particular to a touch screen terminal and a method for locating an electronic document thereof.

BACKGROUND

With the continuous development of the communication technology, more and more wireless terminal devices have stepped into our life and greatly changed our reading ways due to their portability and mobility, so, electronic reading is more and more popular.

When being displayed and read on the existing mobile touch screen terminal, an electronic document is located usually by touching the screen. With the application on a mobile phone as an example, a full text is scanned in advance to generate a chapter/section numbered list thereof, and then, a user slides on the screen to select the required chapter/section and click Ok, which seems reasonable but actually causes poor user experience. For example, when reading a novel or a technical document of many pages, the user always needs to continuously slide on the screen for page turning to find out the required chapter/section if needing to switch between different chapters/sections repeatedly since the chapter/section list is very large and the chapter/section to be browsed has a large span, which is not convenient and is low in the switching efficiency.

Another method for locating the document is to insert a bookmark, and different bookmarks are selected to implement the switching of the user. Such way also has certain problem because a text fragment is usually recorded to be displayed to the user and stored as the bookmark, if too many bookmarks are stored or which chapter/section to switch to cannot be effectively confirmed by the text fragment of the bookmark, a document cannot be located and switched fast either.

SUMMARY

The main purpose of the disclosure is to provide a touch screen terminal and a method for locating an electronic document thereof, in order to solve the problems of low efficiency and inaccurate location of the existing method for locating the electronic document of the touch screen terminal during the switching of chapters/sections.

The disclosure provides a method for locating an electronic document of a touch screen terminal, which includes:

generating a directory listing for an electronic document and storing it;

detecting a screen input in a reading mode of current chapter/section of the electronic document;

when it is detected that a user enables a chapter/section switching function, enabling a chapter/section switching mode to wait for the user to input a number of a chapter/section to switch to;

when it is detected that the user inputs the number of the chapter/section to switch to, matching a directory entry in real time from the stored directory listing and displaying it;

generating a preview for a corresponding chapter/section according to the number of the chapter/section to switch to input by the user and displaying it to the user; and when it is detected that the user inputs a confirmation of the chapter/section switching operation, switching to the previewed chapter/section.

Preferably, the chapter/section number may include a number, a combination of numbers, a combination of a preset letter and a number, a combination of a preset symbol and a number, or a combination of a preset symbol and a preset letter.

Preferably, for the chapter/section number input by the user, the default input sequence may be both from a large unit to a small unit and from a small unit to a large unit in the directory listing.

Preferably, a separator may be existed between two chapter/section numbers.

Preferably, the separator may be a preset punctuation character or a whitespace.

Preferably, the method may further include: after the chapter/section switching mode is enabled, calling a virtual keyboard automatically and displaying it to the user.

Preferably, the generating a preview for a corresponding chapter/section according to the number of the chapter/section to switch to input or selected by the user and displaying it to the user may include:

judging a number of the matched directory entry according to the number of the chapter/section to switch to; when there is one matched directory entry, generating the preview of the chapter/section corresponding to the directory entry and displaying it to the user; and when there is more than one matched directory entry, waiting for the user to select the chapter/section to switch to, and after it is detected that the user selects a chapter/section, generating the preview of the selected chapter/section and displaying it to the user.

Preferably, the method may further include: when the generated preview is displayed to the user, judging whether the confirmation of switching operation is detected within preset time of exiting the chapter/section switching mode, if not, exiting the chapter/section switching mode.

Preferably, in the matching a directory entry from the stored directory listing in real time and displaying it, displaying the matched directory entry together with all the directory entries containing the matched directory entry to the user in a form of a list.

Preferably, the matched directory entry may be selectable, while the directory entries containing the matched directory entry may not be selectable.

Preferably, the list may be displayed to the user in a scrolling form.

Preferably, the preview for the chapter/section may include a title of the chapter/section and contents of a paragraph preset by the user excerpted from the chapter/section.

The disclosure further provides a touch screen terminal, which include a directory listing module, a detection module, a mode switching module, a real-time directory module, a preview module and a chapter/section switching module, wherein the directory listing module is configured to generate a directory listing for an electronic document and to store it;

the detection module is configured to detect a screen input;

the mode switching module is configured to provide a user with a reading function and a chapter/section switching function, and to switch a reading mode to a chapter/section switching mode when the detection module detects that the user enables the chapter/section switching function;

the real-time directory module is configured to match a directory entry in real time from the directory listing module according to a number of a chapter/section input by the user when the detection module detects that the user inputs the number of the chapter/section to switch to, and to display it;

the preview module is configured to generate a preview for a corresponding chapter/section according to the number of the chapter/section to switch to input or selected by the user when the detection module detects that the number of the chapter/section to switch to is input, and to display it to the user; and the chapter/section switching module is configured to switch to the chapter/section previewed by the preview module when the detection module detects a confirmation of the chapter/section switching operation.

Preferably, the touch screen terminal may further include a setting module, which is configured to provide the user with an interface and an option for setting a format and an input sequence of the number of the chapter/section to switch to, a separator, a source of excerpted contents in the preview, and time of exiting the chapter/section switching mode.

Preferably, the detection module may be configured to judge whether the confirmation of switching operation is detected within the preset time of exiting the chapter/section switching mode after detecting the confirmation of the chapter/section to switch to;

the mode switching module may be configured to call a virtual keyboard and display it to the user when switching to the chapter/section switching mode, and to exit the chapter/section switching mode when the detection module does not detect the confirmation of switching operation within the preset time of exiting the chapter/section switching mode; and the preview module may be configured to judge the number of the directory entry matched by the real-time directory module, when the real-time directory module matches one directory entry, to directly generate a preview for the chapter/section corresponding to the directory entry and display it to the user, and when the real-time directory module matches more than one directory entry, to wait for a detection result of the detection module and generate a preview for a selected chapter/section and display it to the user after the detection module detects that the user selects the chapter/section.

Preferably, the mode switching module may be a preset area on the touch screen and is enabled by long pressing, single-point touch, multi-point touch, a voice or a shortcut key.

Preferably, the mode switching module may be displayed as a watermark icon or a watermark character in the preset area.

Through the disclosure, a user can locate the required chapter/section accurately for reading by inputting the number of the chapter/section to switch to without setting a bookmark nor browsing a directory, thereby greatly improving the reading experience. Furthermore, the disclosure is simple to operate and easy to implement.

BRIEF DESCRIPTION OF THE DRAWINGS

FIG. 2 is a preview of Chapter one in an electronic document of the disclosure.

DETAILED DESCRIPTION

To make the technical problem to be solved by the disclosure, the technical scheme and the beneficial effects clearer and more obvious, the disclosure is further described below in conjunction with the drawings and embodiments in detail. It should be understood that the specific embodiments herein are only intended to explain the disclosure instead of limiting the disclosure.

Figure 1:
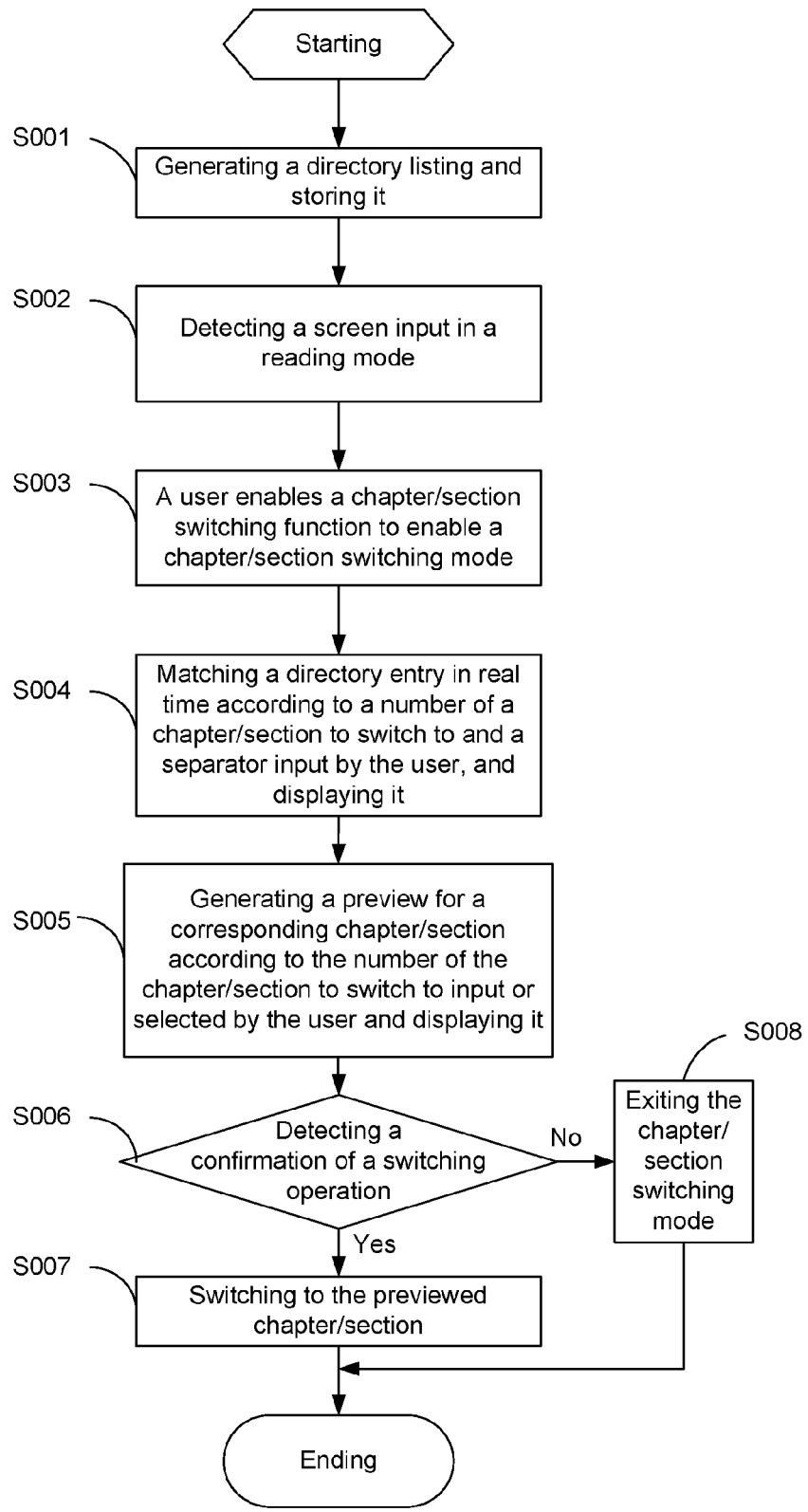
FIG. 1 is a flowchart of a method for locating an electronic document of a touch screen terminal in a preferred embodiment of the disclosure.

As shown in FIG. 1, which is a flowchart of a method for locating an electronic document of a touch screen terminal in a preferred embodiment of the disclosure, the method includes the following steps:

Step 001: A directory listing is generated for an electronic document and is stored.

When a user imports the electronic document, a terminal generates the directory listing for the electronic document automatically and stores it, in order for the use of the user in the subsequent reading.

The directory listing can be generated by setting keywords. For example, for a Chinese document, the keywords can be set as: Volume *, Part *, Round *, Chapter *, Section *, Lesson *, Episode * etc.; and for an English document, the keywords can be set as: Section *, Chapter * etc., wherein "*" is an Arabic number, a Roman number, an English number (such as one, two), or a Chinese number (such as one, two). The directory listing can also be generated in other ways, such as a method for generating a directory in a word document; and all these methods belong to the conventional art, thereby needing no further detailed description here.

Step 002: A touch screen input is detected in a reading mode of the electronic document.

Step 003: When it is detected that the user enables a chapter/section switching function, a chapter/section switching mode is enabled, and at the same time, a virtual keyboard is called automatically and is displayed to the user for the user to input a number of a chapter/section to switch to.

In other embodiments, the virtual keyboard may not be called in this step, and the user can call it manually when needing it.

At the moment, the chapter/section being read is displayed in grey and the input window of the user is displayed above the chapter/section being read in brightness.

Step 004: A directory entry is matched in real time from the stored directory listing and is displayed according to the number of the chapter/section to switch to and the separator input by the user.

The matched directory entry is displayed to the user with all the directory entries containing the matched directory entry in the form of a list; when it is necessary to display many directory entries, the contents in the list can be displayed in a scrolling form; and in the list, the matched directory entry is selectable and the directory entries containing the matched directory entry are not selectable. At the moment, the chapter/section being read is displayed in grey and the list is displayed above the chapter/section being read in brightness.

In the disclosure, the number of the chapter/section to switch to may be a number, such as 1 and 2, a combination of two numbers, such as 11 and 23, the combination of a letter and a number, such as S1 and J1, the combination of a symbol and a number, such as <1, or the combination of a symbol and a letter, such as <J, and is a number or the combination of two numbers by default. For other formats, the user can preset it and use it according to specific contents of the document or their habits.

The separator is a preset punctuation, such as a decimal point and a comma, or a whitespace.

The combination of the chapter/section number and the separator input by the user is input both from a large unit to a small unit and from a small unit to a large unit in the list by default. For example, when the units of the directory are volume, chapter and section (in a descending order), if the user inputs 2.1, it is considered that the user needs to look up Chapter one of Volume two or the user needs to look up Section two of Chapter one, and the located chapter/section is selectable. When the calculation of the input chapter/section number from the large unit to the small unit is the same as that from the small unit to the large unit, a same result will be obtained. For example, when the units of the directory are volume, chapter and section (in a descending order), if the user inputs 2.1.2, Section two of Chapter one of Volume two will be located no matter the calculation is from the large unit to the small unit or from the small unit to the large unit. When only one chapter/section is located, the next step is executed directly; when multiple chapters/sections are located, it is necessary to wait for the user to make a selection manually, and the user clicks the corresponding entry on the screen to execute the next step.

It is assumed that the electronic document is a Chinese document, its directory listing is as follows:

TABLE 1

Volume one: xx
    Chapter one: xx
        Episode one: xx
            Section one: xx
    Chapter two: xx
        Episode one: xx
            Section one: xx
            Section two: xx
Volume two: xx
    Chapter one: xx
        Episode one: xx
            Section one: xx
            Section two: xx
        Episode two: xx
            Section one: xx
            Section two: xx
    Chapter two: xx
        Episode one: xx
            Section one: xx
        Episode two: xx
            Section one: xx
            Section two: xx
        Episode three: xx
            Section one: xx
            Section two: xx When the user inputs 1., the locations are the minimum unit section and the maximum unit volume in the directory listing by default; and at the moment, Volume one and all the chapters/sections having Section one in the electronic document are displayed, as shown in Table 2:

TABLE 2

<u>Volume one: xx</u>
    Chapter one: xx
        Episode one: xx
            <u>Section one: xx</u>
    Chapter two: xx
        Episode one: xx
            <u>Section one: xx</u>
<u>Volume two: xx</u>
    Chapter one: xx
        Episode one: xx
            <u>Section one: xx</u>
        Episode two: xx
            <u>Section one: xx</u>
    Chapter two: xx
        Episode one: xx
            <u>Section one: xx</u>
        Episode two: xx
            <u>Section one: xx</u>

TABLE 2-continued

Episode three: xx
            <u>Section one: xx</u>

At the moment, as displayed above, Volume one and all Sections one are selectable, namely, all the underlined chapters/sections are selectable and other chapters/sections are not selectable; and the user can click the required selectable chapter/section on the screen to execute the next step.

When the user continues to input 1.1., the locations are volume, chapter, episode and section in the directory listing by default; and at the moment, Chapter one of Volume one and all the chapters/sections having Section one of Episode one in the electronic document are displayed, as shown in Table 3:

TABLE 3

Volume one: xx
    <u>Chapter one: xx</u>
        Episode one: xx
            <u>Section one: xx</u>
    Chapter two: xx
        Episode one: xx
            <u>Section one: xx</u>
Volume two: xx
    Chapter one: xx
        Episode one: xx
            <u>Section one: xx</u>
    Chapter two: xx
        Episode one: xx
            <u>Section one: xx</u>

At the moment, as displayed above, only Chapter one of Volume one and all Sections one are selectable, namely, all the underlined chapters/sections are selectable and other chapters/sections are not selectable; and the user can click the required selectable chapter/section on the screen to execute the next step.

When the user continues to input 1.1.1., the locations are chapter, episode and section, and volume, chapter and episode in the directory listing by default; and at the moment, Episode one of Chapter one of Volume one and all the chapters/sections having Section one of Episode one of Chapter one in the electronic document are displayed, as shown in Table 4:

TABLE 4

Volume one: xx
    Chapter one: xx
        <u>Episode one: xx</u>
            <u>Section one: xx</u>
Volume two: xx
    Chapter one: xx
        Episode one: xx
            <u>Section one: xx</u>

At the moment, as displayed above, only Episode one of Chapter one of Volume one and all Sections one are selectable, namely, all the underlined chapters/sections are selectable and other chapters/sections are not selectable; and the user can click the required selectable chapter/section on the screen to execute the next step.

When the user continues to input 1.1.1.1., the locations are volume, chapter, episode and section in the directory listing by default; and at the moment, all the chapters/sections having Section one of Episode one of Chapter one of Volume one in the electronic document are displayed, as shown in Table 5:

TABLE 5

| |
|---|
| Volume one: xx |
| Chapter one: xx |
| Episode one: xx |
| Section one: xx |

At the moment, as displayed above, only Section one is selectable, namely, the underlined chapter/section in the table is selectable and other chapters/sections are not selectable, and the next step is executed directly.

For the selectable chapter/section, its state can be further shown by being highlighted or in other ways in other embodiments, thus not described one by one.

The user can set that the number of the chapter/section to switch to is input from a large unit to a small unit or from a small unit to a large unit through the option provided by the touch screen terminal.

In this step, the number of chapter/section number input by the user should be less than or equal to that of units in the directory of the electronic document. For example, the units of the directory are volume, chapter and section, the number of chapter/section number input by the user should be less than or equal to 3; and when the number of chapter/section number input by the user is equal to that of units in the directory of the electronic document, the user can be prompted for completed input by being prevented from input or the user is allowed to continue the input but is prompted for "no corresponding chapter/section" to be notified of wrong input.

Step 005: When it is detected that the number of the chapter/section to switch to is input, a preview page of a corresponding chapter/section is generated according to the chapter/section number input by the user and is displayed to the user.

In this step, it is necessary to determine whether to directly generate the preview page or wait for the user to make a selection according to the number of the directory entry finally matched in step 004 when the user completes the input; if only one directory entry is matched in step 004, a preview page is directly generated for the chapter/section corresponding to the direction entry and is displayed to the user; and if more than one directory entry is matched in step 004, it is necessary to wait for the user to select the chapter/section to switch to, and after it is detected that the user selects a chapter/section, a preview is generated for the selected chapter/section and is displayed to the user.

The preview of the chapter/section includes the title of the chapter/section and the contents excerpted from the preset part of the chapter/section; and the user can set an extracted paragraph for the preview contents of the chapter/section as required.

As shown in FIG. 2, which is a preview of Chapter one in an electronic document of the disclosure, FIG. a is a preview showing the contents excerpted from the beginning of Chapter one, FIG. b is a preview showing the contents excerpted from the middle of Chapter one, and FIG. c is a preview showing the contents excerpted from the ending of Chapter one.

Step 006: A screen input is detected and whether a confirmation of switching operation of the user is detected within preset time of exiting the chapter/section switching mode is judged, if so, step 007 is executed, otherwise, step 008 is executed.

The user can confirm the switching operation by clicking the preview area of the screen or pressing a shortcut key.

Step 007: Switch to the previewed chapter/section and display it, and the switching of the chapter/section is ended.

Step 008: The chapter/section switching mode is exited to go back to the reading mode of the current chapter/section, and the switching of the chapter/section is ended.

Figure 3:
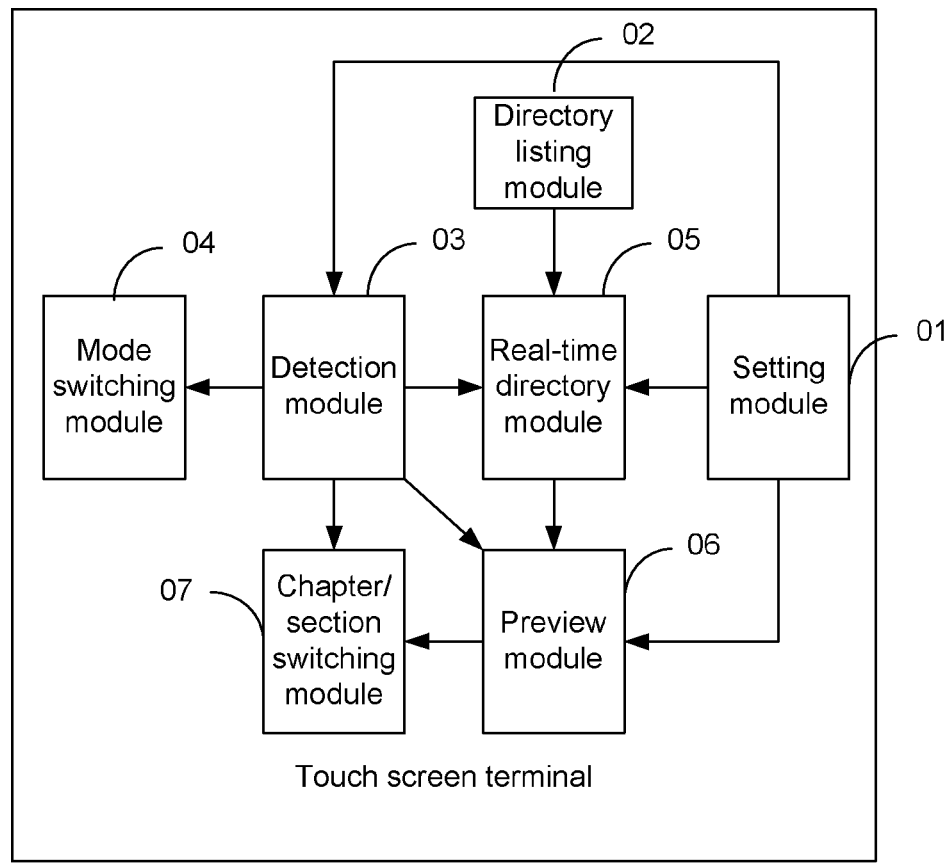
FIG. 3 is a block diagram showing the principle of a touch screen terminal in a preferred embodiment of the disclosure.

As shown in FIG. 3, which is a block diagram showing the principle of a touch screen terminal in a preferred embodiment of the disclosure, the touch screen terminal includes a setting module 01, a directory listing module 02, a detection module 03, a mode switching module 04, a real-time directory module 05, a preview module 06 and a chapter/section switching module 07, wherein the setting module 01 is configured to provide a user with an interface and an option for setting a format and an input sequence of a number of a chapter/section to switch to, a separator, a source of excerpted contents in a preview, and time of exiting the chapter/section switching mode;

the directory listing module 02 is configured to generate a directory listing for an electronic document and to store it;

the detection module 03 is configured to detect a screen input and to judge whether a confirmation of switching operation is detected within preset time of exiting a chapter/section switching mode after detecting the confirmation of the chapter/section to switch to; and the mode switching module 04 is configured to provide the user with a reading function and a chapter/section switching function, to switch a reading mode to the chapter/section switching mode and call a virtual keyboard to display it to the user at the same time when the detection module 03 detects that the user enables the chapter/section switching function, and to exit the chapter/section switching mode when the detection module 03 does not detect the confirmation of switching operation within the preset time of exiting the chapter/section switching mode.

In the embodiment, the mode switching module 04 is a preset area on the touch screen or is displayed as a watermark icon or a watermark character in the area, and is enabled by long pressing, single-point touch, multi-point touch, a voice or a shortcut key.

The real-time directory module 05 is configured to match a directory entry in real time from the directory listing module according to the chapter/section number input by the user when the detection module 03 detects that the user inputs the number of the chapter/section to switch to, and to display it to the user with all the directory entries containing the matched directory entry in a form of a static or scrolling list; and in addition, in the list, the matched directory entry is selectable and the directory entries containing the matched directory entry are non-selectable.

The preview module 06 is configured, when the detection module 03 detects the number of the chapter/section to switch to is input, to judge a number of the directory entry matched by the real-time directory module 05, when the real-time directory module 05 matches one directory entry, to directly generate a preview for the chapter/section corresponding to the directory entry and display it to the user, and when the real-time directory module 05 matches more than one directory entry, to wait for a detection result of the detection module 03 and generate a preview for a selected chapter/section and display it to the user after the detection module 03 detects that the user selects the chapter/section.

The chapter/section switching module 07 is configured to switch to the chapter/section previewed by the preview module 06 when the detection module 03 detects the confirmation of the chapter/section switching operation.

What described above describes preferred embodiments of the disclosure, as shown above, it should be understood that the disclosure is not limited to the form disclosed here and shall not be regarded as the exclusion of other embodiments, so that it can be applied to various other combinations, modifications and environments and can be modified by the instruction above or the technology or knowledge in the related fields within the concept scope of the text. But the change and variation made by those skilled in the art within the spirit and scope of the disclosure shall be within the scope of protection of the claims of the disclosure.

INDUSTRIAL APPLICABILITY

Through the disclosure, a directory listing is generated for an electronic document and is stored; a screen input is detected in a reading mode of the current chapter/section of the electronic document; when it is detected that a user enables a chapter/section switching function, a chapter/section switching mode is enabled to wait for the user to input a number of the chapter/section to switch to; when it is detected that the user inputs the number of the chapter/section to switch to, a directory entry is matched in real time from the stored directory listing and is displayed, and a preview for a corresponding chapter/section is generated and is displayed to the user according to the number of the chapter/section to switch to input or selected by the user; and when the confirmation of switching operation is detected, it is necessary to switch to the previewed chapter/section. The disclosure is simple to operate and easy to implement, and improves the reading experience.

The invention claimed is:

1. A method for locating an electronic document of a touch screen terminal, comprising:
   generating a directory listing for an electronic document and storing it;
   detecting a screen input in a reading mode of a current chapter or section of the electronic document;
   when it is detected that a user enables a chapter or section switching function, enabling a chapter or section switching mode to wait for the user to input a number of a chapter or section to switch to;
   when it is detected that the user inputs the number of the chapter or section to switch to, matching a directory entry in real time from the stored directory listing and displaying it;
   generating a preview for a corresponding chapter or section according to the number of the chapter or section to switch to input by the user and displaying it to the user; and
   when it is detected that the user inputs a confirmation of the chapter or section switching operation, switching to the previewed chapter or section,
   wherein the generating a preview for a corresponding chapter or section according to the number of the chapter or section to switch to input by the user and displaying it to the user comprises:
   judging a number of the matched directory entry according to the number of the chapter or section to switch to; when there is one matched directory entry, generating the preview of the chapter or section corresponding to the directory entry and displaying it to the user; and when there is more than one matched directory entry, waiting for the user to select the chapter or section to switch to, and after it is detected that the user selects a chapter or section, generating the preview of the selected chapter or section and displaying it to the user;
   wherein in the matching a directory entry in real time from the stored directory listing and displaying it, displaying the matched directory entry together with all the directory entries containing the matched directory entry to the user in a form of a list,
   wherein matching a directory entry in real time from the stored directory listing and displaying the matched directory entry together with all the directory entries containing the matched directory entry to the user in a form of a list, comprises:
   matching the directory entry both from a large unit to a small unit and from a small unit to a large unit in the directory listing; and
   displaying a matched directory entry matched from the large unit to the small unit and all the directory entries matched from the small unit to the large unit.

2. The method according to claim 1, wherein the number of the chapter or section to switch to input by the user comprises a number, a combination of numbers, a combination of a preset letter and a number, a combination of a preset symbol and a number, or a combination of a preset symbol and a preset letter.

3. The method according to claim 1, wherein a separator is displayed between two chapter or section numbers.

4. The method according to claim 3, wherein the separator is a preset punctuation character or a whitespace.

5. The method according to claim 1, further comprising: after the chapter or section switching mode is enabled, calling a virtual keyboard automatically and displaying it to the user.

6. The method according to claim 1, further comprising: when the generated preview is displayed to the user, judging whether the confirmation of the chapter or section switching operation is detected within a preset time of exiting the chapter or section switching mode, if not, exiting the chapter or section switching mode.

7. The method according to claim 1, wherein the matched directory entry is selectable, while a plurality of directory entries containing the matched directory entry are not selectable.

8. The method according to claim 1, wherein the list is displayed to the user in a scrolling form.

9. The method according to claim 1, wherein the preview of the chapter or section comprises a title of the chapter or section and contents of a paragraph preset by the user excerpted from the chapter or section.

10. A touch screen terminal comprising a computer processor and a non-transitory computer storage medium storing computer readable instructions that when executed by the computer processor cause the computer processor to:
   generate a directory listing for an electronic document and store it;
   detect a screen input in a reading mode of a current chapter or section of the electronic document;
   when it is detected that a user enables a chapter or section switching function, enable a chapter or section switching mode to wait for the user to input a number of a chapter or section to switch to;
   when it is detected that the user inputs the number of the chapter or section to switch to, match a directory entry in real time from the stored directory listing and display it;
   generate a preview for a corresponding chapter or section according to the number of the chapter or section to switch to input by the user and display it to the user; and
   when it is detected that the user inputs a confirmation of the chapter or section switching operation, switch to the previewed chapter or section,
   wherein the generating a preview for a corresponding chapter or section according to the number of the chapter or section to switch to input by the user and displaying it to the user causes the computer processor to:
judge a number of the matched directory entry according to the number of the chapter or section to switch to;
when there is one matched directory entry, generate the preview of the chapter or section corresponding to the directory entry and display it to the user; and when there is more than one matched directory entry, wait for the user to select the chapter or section to switch to, and after it is detected that the user selects a chapter or section, generate the preview of the selected chapter or section and display it to the user;
wherein in the matching a directory entry in real time from the stored directory listing and displaying it, display the matched directory entry together with all the directory entries containing the matched directory entry to the user in a form of a list;
wherein matching a directory entry in real time from the stored directory listing and displaying the matched directory entry together with all the directory entries containing the matched directory entry to the user in a form of a list causes the computer processor to:
match the directory entry both from a large unit to a small unit and from a small unit to a large unit in the directory listing: and
display a matched directory entry matched from the large unit to the small unit and all the directory entries matched from the small unit to the large unit.

11. The touch screen terminal comprising the computer processor and the non-transitory computer storage medium storing computer readable instructions according to claim 10, that when the computer readable instructions are executed by the computer processor further cause the computer processor to:
provide the user with an interface and an option for setting a format and an input sequence of the number of the chapter or section to switch to, a separator, a source of excerpted contents in the preview, and a time of exiting the chapter or section switching mode.

12. The touch screen terminal comprising the computer processor and the non-transitory computer storage medium storing computer readable instructions according to claim 10, that when the computer readable instructions are executed by the computer processor further cause the computer processor to:
judge whether the confirmation of the chapter or section switching operation is detected within the preset time of exiting the chapter or section switching mode after detecting the number of the chapter or section to switch to;
call a virtual keyboard and display it to the user when switching to the chapter or section switching mode, and to exit the chapter or section switching mode when the computer processor does not detect the confirmation of switching operation within the preset time of exiting the chapter or section switching mode.

13. The touch screen terminal comprising the computer processor and the non-transitory computer storage medium storing computer readable instructions according to claim 10, that when the computer readable instructions are executed by the computer processor further cause the computer processor to:
enable a preset area on the touch screen by long pressing, single-point touch, multi-point touch, a voice or a shortcut key.

14. The touch screen terminal comprising the computer processor and the non-transitory computer storage medium storing computer readable instructions according to claim 13, that when the computer readable instructions are executed by the computer processor further cause the computer processor to:
display a watermark icon or a watermark character in the preset area.

15. The method according to claim 2, wherein a separator is displayed between two chapter or section numbers.

16. The method according to claim 15, wherein the separator is a preset punctuation character or a whitespace.

17. The touch screen terminal comprising the computer processor and the non-transitory computer storage medium storing computer readable instructions according to claim 11, that when the computer readable instructions are executed by the computer processor further cause the computer processor to:
enable a preset area on the touch screen by long pressing, single-point touch, multi-point touch, a voice or a shortcut key.

18. The touch screen terminal comprising the computer processor and the non-transitory computer storage medium storing computer readable instructions according to claim 17, that when the computer readable instructions are executed by the computer processor further cause the computer processor to:
display a watermark icon or a watermark character in the preset area.

* * * * *